United States Patent [19]

Kamiyama et al.

[11] Patent Number: 4,857,790

[45] Date of Patent: Aug. 15, 1989

[54] WINDING PATTERNS FOR ARMATURES

[75] Inventors: Akira Kamiyama; Nobuhisa Hongo; Toyomi Matsuki; Kenji Kanai, all of Gunma, Japan

[73] Assignee: Mitsuba Electric Mfg. Co., Ltd., Japan

[21] Appl. No.: 162,440

[22] Filed: Mar. 1, 1988

[30] Foreign Application Priority Data

Mar. 6, 1987 [JP] Japan ................................... 62-51723

[51] Int. Cl.$^4$ ............................................ H02K 13/00
[52] U.S. Cl. ..................................... 310/234; 310/198; 310/205; 310/208
[58] Field of Search ............... 310/233, 234, 236, 198, 310/200–207, 261, 264, 265, 208, 237; 29/597

[56] References Cited

U.S. PATENT DOCUMENTS

| 3,191,269 | 6/1965 | Moore | 310/233 |
| 3,448,311 | 6/1969 | Mommsen | 310/234 |
| 3,506,864 | 4/1970 | Miller | 310/234 |
| 3,705,459 | 12/1972 | Biddison | 310/234 |
| 4,459,503 | 7/1984 | Kropp | 310/234 |

FOREIGN PATENT DOCUMENTS

80/02089 10/1980 PCT Int'l Appl. ................. 310/234

*Primary Examiner*—R. Skudy
*Attorney, Agent, or Firm*—Skjerven, Morrill, MacPherson, Franklin & Friel

[57] ABSTRACT

A winding pattern for a motor rotor comprising an armature mounted on a rotary shaft and provided with a plurality of longitudinal slots defined a plurality of core teeth; a commutator mounted on the rotary shaft at a longitudinally spaced relationship to the armature and provided with circumferentially divided segments; and one or more sets of coils wound around the core teeth through the core slots. The very first starting lead of the set of coils comprises a first span which extends from a first commutator segment into a first core slot, a second span which extends out of the first core slot and is wrapped around the rotary shaft at a part opposite to the commutator with respect to the armature, a third span which is passed through a second core slot from the second span towards the commutator, a fourth span which extends out of the second core slot and is wrapped around a part of the rotary shaft intermediate between the armature and the commutator over a certain angle. The first span of the first starting lead extends obliquely between the commutator and the armature while other starting leads and ending leads of the coil extend obliquely however in opposite sense. Thus, the leads are not subjected to undue pressure from subsequently wound coils and the starting lead is properly anchored for winding the first coil at the same time.

7 Claims, 3 Drawing Sheets

WINDING PATTERNS FOR ARMATURES

TECHNICAL FIELD

The present invention relates to winding patterns for the armatures of electric motors and in particular to armature winding patterns having advantageous features in the anchoring of the coil wire and the arrangement of the coil leads extending between the coil winding and the commutator.

BACKGROUND OF THE INVENTION

Conventionally, in an electric motor, starting and ending leads of the coils of wire wound around armature core teeth are connected to the corresponding segments of a commutator by shortest possible distances. There are two major problems in manufacturing such armatures. First, since the winding process for the coils and the crimping or soldering process for connecting the coil wire to the tangs of the commutator are performed as separate processes, the very first starting end of the coil wires is required to be held to the first tang with a special jig such as a pair of jaws because a considerable tension is applied to the coil wire as it is being wound and the need for such a jig is detrimental to the efficiency of the manufacturing process. Further, the need to synchronize the motion of the jig to the initial indexing motion applied to the armature is also detrimental to the efficiency of the manufacturing process. Second, successively wound coils of wire tend to apply pressure to the leads of the previously wound coils of wire and care is needed to prevent damage to the coil wire as a result of this pressure from the subsequently wound coils. This could cause a serious problem depending on the sizes of the armature and the commutator and the distance between them.

To the end of eliminating the first problem, U.S. Pat. No. 3,191,269 discloses an anchoring method for securing the coil wire while winding the first coil in which a certain length of the starting end of the coil wire is passed through one of the core slots towards the commutator and is then hooked to the very first commutator tang. According to this method, since the starting end of the coil wire is thus anchored, the coil wire stays engaged to the commutator tangs until the first coil is fully wound and the coil wire can be permanently connected to the tangs by soldering or welding afterwards. This proposal eliminates the first problem mentioned above in securing coil leads while the first coil is being wound but this method involves a certain length of loose starting lead which needs to be trimmed. Furthermore, it is impossible to completely trim this loose end because the loose end is covered by the subsequently wound coils.

U.S. Pat. Nos. 3,506,864 and 3,448,311 propose methods of winding a motor armature in which the coil leads connected to commutator segments are made to extend obliquely along the circumferential direction. According to these proposals, the coil leads extend partly tangentially in relation with the rotary shaft and the second problem mentioned above is avoided because the coil leads are passed adjacent to the outer circumferential surface of the rotary shaft so as to involve a certain tangential component and get wrapped closely around the rotary shaft.

However, according to these proposals, since the armature is required to be indexed over a large angle after connecting the starting end of the coil wire to the very first tang of the commutator, some problems arise in keeping the starting end of the coil wire held onto the commutator tang. Therefore, substantial alteration must be made to the armature winding machine to implement these methods and the cost for this alteration may be too high to be acceptable.

BRIEF SUMMARY OF THE INVENTION

In view of such problems of the prior art, a primary object of the present invention is to provide improved winding patterns for the armatures of electric motors which can be readily implemented with conventional armature winding machines and offer a favorable anchoring of the coil wire prior to winding the first coil.

A second object of the present invention is to provide improved winding patterns for the armatures of electric motors which can be readily implemented with conventional armature winding machines and prevent the leads extending between armature coils and commutator tangs from receiving excessive pressure from subsequently formed coils.

A third object of the present invention is to provide improved winding patterns for the armatures of electric motors which provide a favorable anchoring of coil wire without leaving a loose end.

According to the present invention, these and other objects of the present invention can be accomplished by providing a winding pattern for a motor rotor comprising an armature mounted on a rotary shaft and provided with a plurality of longitudinal slots defined by a plurality of core teeth; a commutator mounted on the rotary shaft at a longitudinally spaced relationship to the armature and provided with circumferentially divided segments; and at least one set of coils wound around the core teeth through the core slots, wherein: a very first starting lead of the set of coils comprises a first span which extends from a first commutator segment into a first core slot, a second span which extends out of the first core slot and is wrapped over a first angle around the rotary shaft at a part opposite to the commutator with respect to the armature, and a third span which is passed into a second core slot from the second span towards the commutator and extends out of the second core slot to be wrapped over a second angle around a part of the rotary shaft intermediate between the armature and the commutator.

To the end of obtaining a favorable anchoring action, the first angle is preferably 180 degrees or greater, and more preferably 360 degrees so that the first core slot and the second core slot are one and the same slot.

According to a preferred embodiment of the present invention, the first span of the first starting lead of the coil set extends obliquely from the commutator to the armature so as to involve a certain tangential component while starting leads of the other coils and ending leads of all the coils extend obliquely in opposite sense in relation with the first span of the very first starting lead from the commutator to the armature so as to involve a certain tangential component.

Thus, since the coil leads are wrapped closely around the rotary shaft, the leads are not placed under excessive pressure from the subsequently wound coil wires.

Preferably, the starting leads of the other coils extending between the commutator and the armature are more oblique than the ending leads of the other coils. This is preferable because the ending leads tend to extend from the coils at locations radially further away from the rotary shaft than the ending leads and an efficient arrangement of the coil leads can be accomplished by minimizing the lengths of the coil leads without increasing the possibility of damage being made to the coil leads.

The present invention can be applied to both single flier winding machines and double flier winding machines alike and the armature may accordingly comprise only one coil set or a pair of coil sets.

BRIEF DESCRIPTION OF THE DRAWINGS

The present invention will now be shown and described in the following in terms of concrete embodiments thereof with reference to the appended drawings, in which.

DETAILED DESCRIPTION OF THE PREFERRED EMBODIMENTS

Figure 1:
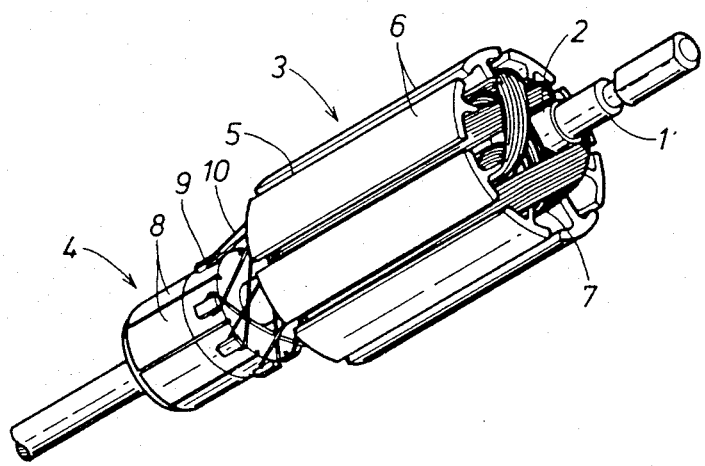
FIG. 1 is a perspective view of a motor armature to which the present invention is applied.

FIG. 1 shows a motor armature to which the present invention is applied. A sleeve 2 is fitted over an intermediate part of a rotary shaft 1, and an armature 3 and a commutator 4 are fitted over this sleeve 2 in a longitudinally mutually spaced relationship. The armature 3 consists of a plurality of laminated steel plates and is provided with eight longitudinal slots 5 which define eight circumferentially spaced core teeth 6. A plurality of coils 7 are wound around these core teeth 6 through these slots 5. The commutator 4 is provided with eight circumferentially arranged segments 8 which are insulated from each other, and each of the segments 8 is provided with a tang 9. Leads 10 of the coils 7 are connected to these tangs 9 as described hereinafter.

Figure 2:
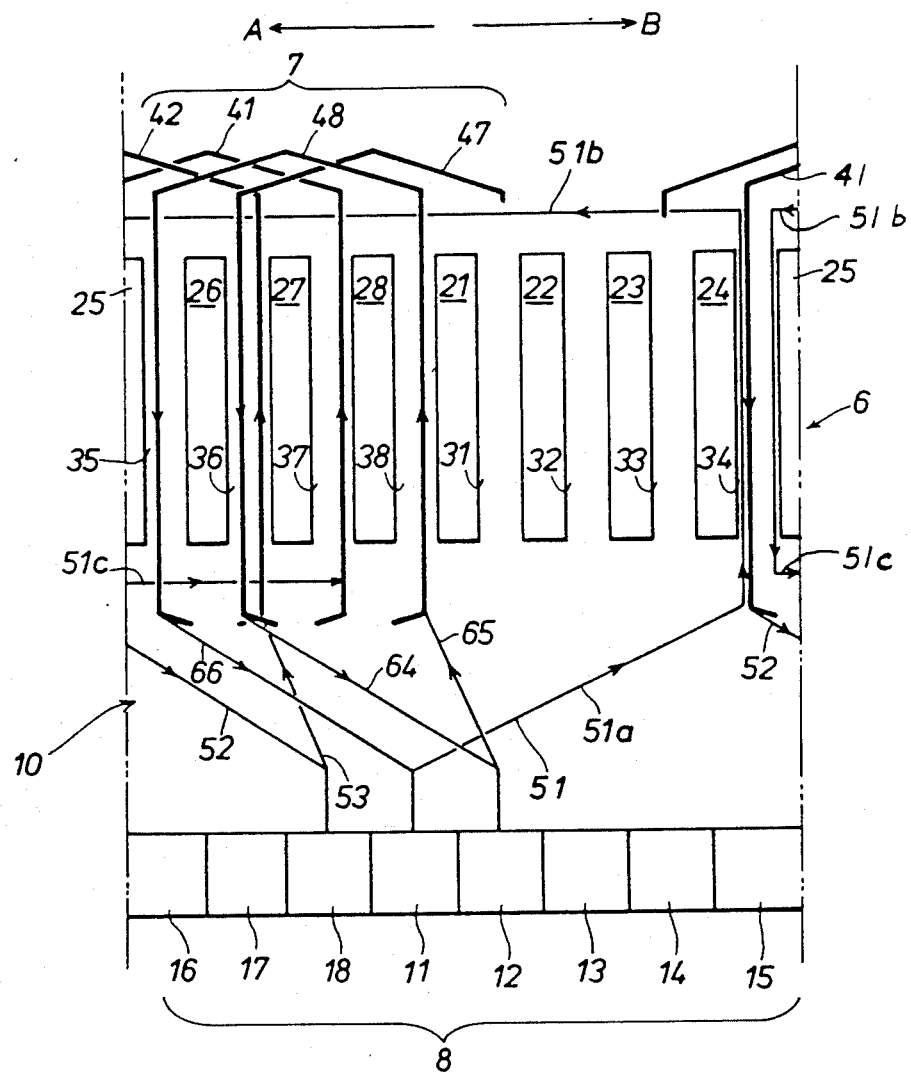
FIG. 2 is a diagram for illustrating a first embodiment of the winding pattern according to the present invention.

FIG. 2 shows a first embodiment of the winding pattern according to the present invention which is formed by a single flier coil winding machine. The eight commutator segments 8 are individually denoted with numerals 11 through 18. The core teeth 6 are likewise individually denoted with numerals 21 through 28 while the individual slots 5 are denoted with numerals 31 through 38. Exemplary coil patterns 41, 42, 47 and 48 are shown.

The starting lead 51 of the coil wire is engaged to the segment 11 and is then passed obliquely in the direction indicated by B or to the right in FIG. 2 as denoted by numeral 51a. The mentioned segment 11 aligns with the slot 38 defined between the core teeth 28 and 21 and the starting lead 51 is passed into the slot 34 which is spaced from the mentioned slot 38 by four of the core teeth 6 or by 180 degrees to the right. After the coil lead is passed through the slot 34, it is then wound around the rotary shaft 1 in the direction indicated by A or to the left in FIG. 2 on the other side of the armature as denoted by numeral 51b, and is again passed through the same slot 34 back towards the commutator 8. Thereafter, the coil wire denoted as the lead 51c is passed around the rotary shaft 1 by an angle corresponding to three of the core teeth 6 and is passed into the slot 37 away from the commutator 8, thus forming a first coil 41 counterclockwise in FIG. 2 around three of the core teeth 25, 26 and 27.

The ending lead 52 of the coil 41 is connected to the segment 18 which is adjacent to the segment 11 in the direction indicated by A or to the left in FIG. 2 and the coil wire is then passed into the slot 36 which is spaced from the slot 37 opposing the segment 18 by one tooth to the left as the starting lead 53 of the second coil 42. The second coil 42 is also wound around three of the core teeth 24, 25 and 26 which are spaced from the first coil 41 by one slot to the left.

The third through the eighth coils 43 through 48 (coils 45–48 not being shown so as to avoid drawing clutter) are each wound around the corresponding three core teeth in a sequential manner, each spaced to the left by one core tooth in relation to the preceding coil. The starting lead of each of these coils extend obliquely to the left by one core tooth from the corresponding commutator segment to the corresponding coil while the ending lead of each of these coils extend obliquely to the right by three core teeth from the corresponding coil to the corresponding commutator segment. Thus, all the starting and ending leads with the exception of the very first starting lead 51 extend obliquely in the same sense between the commutator 8 and the armature 3. The ending lead 66 (not shown) of the eighth coil 48 (not shown) or the last coil is connected to the first commutator segment 11.

Thus, only the starting lead 51 extends obliquely in one direction while all the other coil leads 52 through 65 (coil leads 54–63 not being shown so as to avoid drawing clutter) extend obliquely in the other direction. In this embodiment, all the starting leads, with the exception of the very first starting lead, extend over an angle corresponding to one core tooth circumferentially around the rotary shaft 1 between the corresponding coil and the corresponding commutator segment while all the ending leads extend over an angle corresponding to three core teeth circumferentially around the rotary shaft between the corresponding coil and the corresponding commutator segment. This is advantageous because the ending leads tend to extend from the coils at locations radially further away from the rotary shaft than the ending leads and an efficient arrangement of the coil leads can be accomplished by minimizing the lengths of the coil leads without increasing the possibility of damage being made to the coil leads.

Since the leads 51 through 65 to the extend shown are obliquely wrapped around the rotary shaft 1 between the armature 3 and the commutator 8, the leads are not excessively pressed by the subsequently wound coils. Further, since the starting lead 51 of the coil wire is connected to the segment 11 and is then passed through the slot 34 twice and fully around the rotary shaft 1 on the other side of the armature, even when the tool for engaging the starting lead 51 of the coil wire to the tang of the segment 11 is removed prior to winding the first coil 41, the starting lead of the coil wire is kept engaged to the tang of the segment 11 and the first coil 41 can be wound while applying appropriate tension to the coil wire.

Figure 3:
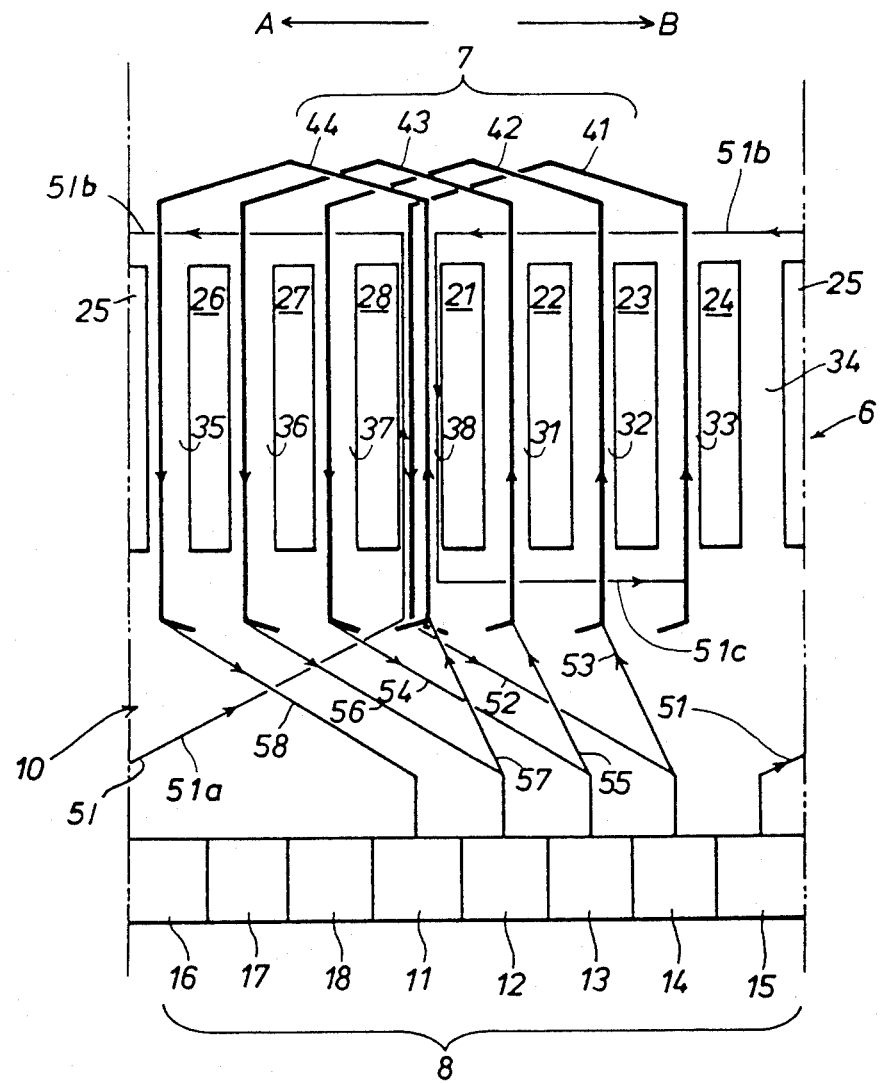
FIG. 3 is a view similar to FIG. 2 showing a second embodiment of the present invention.

FIG. 3 shows a second embodiment of the winding pattern according to the present invention which is formed by a double flier winding machine. The armature 3 and the commutator 8 of this embodiment are identical to those of the preceding embodiment. In this case, however, each flier winds four coils and the starting lead of the coil wire of one of the fliers is connected to the terminal lead of the coil wire of the other flier. In the following description, for the simplification of description, only the coils and the lead wires handled by one of the fliers are mentioned but it is obvious to a person skilled in the art that the other coils are wound by the other flier in mutually 180 degrees spaced relationship. And, the parts of the present embodiment which correspond to those of the previous embodiment are denoted with like numerals.

The starting lead of the coil wire is engaged to one of the segments 15 and is passed, as denoted by numeral 51a, through the slot 38 which is 180 degrees spaced from the slot 34 aligning with the segment 15. After being passed through the slot 38, the coil wire is passed around the rotary shaft 1 of the motor rotor in the direction indicated by A or to the left in FIG. 3 as denoted by numeral 51b and is then again passed through the same slot 38, however, in the opposite direction. Thereafter, the coil lead denoted as the lead 51c is passed around the rotary shaft 1 by an angle corresponding to three of the core teeth 21, 22 and 23 and is passed into the slot 33 away from the commutator 8, thus forming a first coil 41 counterclockwise in FIG. 3 around the three core teeth 21, 22 and 23.

The ending lead 52 of the coil 41 is connected to the segment 14 which is adjacent to the segment 15 to the left and the coil wire is then passed into the slot 32 which is spaced from the slot 33 opposing the segment 14 by one core tooth to the left as the starting lead 53 of the second coil 42. The second coil 42 is also wound around three of the core teeth 28, 21 and 22 which are spaced from the first coil 41 by one slot to the left.

The third and the fourth coil 43 and 44 are each wound around the corresponding three core teeth in a sequential manner, each spaced to the left by one core tooth in relation to the preceding coil. The starting lead of each of these coils extends obliquely to the left by one core tooth from the corresponding commutator segment to the corresponding coil while the ending lead of each of these coils extends obliquely to the right by three core teeth from the corresponding coil to the corresponding commutator segment. The ending lead 58 of the fourth coil 44 is connected to commutator segment 11 and the last coil (not shown) is connected to the first commutator segment 15.

Thus, only the starting lead 51 extends obliquely in one direction while all the other coil leads 52 through 58 and successive leads (not shown) for the other coils extend obliquely in the other direction. In this embodiment, all the starting leads, with the exception of the very first starting lead 51, extend over an angle corresponding to one core tooth around the rotary shaft between the corresponding coil and the corresponding commutator segment while all the ending leads extend over an angle corresponding to three core teeth around the rotary shaft between the corresponding coil and the corresponding commutator segment. Since the leads 51 through 58 are obliquely wrapped around the rotary shaft 1, the leads are not pressed by the subsequently wound coils. Further, since the starting end of the coil wire is connected to the segment 15 and is then passed through the slot 38 twice and fully around the rotary shaft 1 on the other side of the armature, even when the tool for engaging the starting end of the coil wire to the tang of the segment 15 is removed prior to winding the first coil 41, the starting end of the coil wire is kept engaged to the tang of the segment 15 and the first coil can be wound while applying appropriate tension to the coil wire.

The present invention is not limited to the above described embodiments. For instance, the first slot into which the starting end of the coil wire is passed is not limited to the slot 34 of the first embodiment and the slot 38 of the second embodiment but may be other slots such as the slots which are adjacent to them or any of the slots which are spaced from the segments 11 and 15 to which the initial ends of the coil wires are connected in the direction indicated by B in FIGS. 2 and 3.

Thus, according to the present invention, the handling of the leads is simplified without making much changes to existing flier armature winding machines, and considerable advantages will be obtained in improving the reliability of the motor rotors and simplifying the process of manufacturing motors.

What we claim is:

1. A winding pattern for a motor rotor comprising an armature mounted on a rotary shaft and provided with a plurality of longitudinal slots defined by a plurality of core teeth; a commutator mounted on the rotary shaft at a longitudinally spaced relationship to the armature and provided with circumferentially divided segments; and at least one set of coils wound around the core teeth through the core slots, wherein:

a very first starting lead of the at least one set of coils comprises a first span which is anchored to and extends from a first commutator segment into a first core slot, a second span which extends out of the first core slot and is wrapped over a first angle around the rotary shaft at a position opposite to the commutator with respect to the armature, and a third span which is passed into a second core slot from the second span towards the commutator and extends out of the second core slot to be wrapped over a second angle around a part of the rotary shaft intermediate between the armature and the commutator.

2. A winding pattern for a motor rotor as defined in claim 1, wherein the first angle is 180 degrees or greater.

3. A winding pattern for a motor rotor as defined in claim 2, wherein the first angle is 360 degrees and the first core slot and the second core slot are the same slot.

4. A winding pattern for a motor rotor as defined in claim 3, wherein the first span of the first starting lead of the coil set extends obliquely from the commutator to the armature so as to involve a certain tangential component while starting leads of the other coils and ending leads of all the coils extend obliquely in an opposite direction in relation with the first span of the very first starting lead from the commutator to the armature so as to involve a certain tangential component.

5. A winding pattern for a motor rotor as defined in claim 4, wherein the starting leads of the other coils extending between the commutator and the armature are more oblique than the ending leads of the other coils.

6. A winding pattern for a motor rotor as defined in claim 1, wherein the armature comprises only one coil set.

7. A winding pattern for a motor rotor as defined in claim 1, wherein the armature comprises a pair of coil sets which are arranged about the armature so as to oppose each other by 180 degrees.

* * * * *